United States Patent
Atyam et al.

(10) Patent No.: US 8,327,370 B2
(45) Date of Patent: Dec. 4, 2012

(54) DYNAMIC POLICY MANAGER METHOD, SYSTEM, AND COMPUTER PROGRAM PRODUCT FOR OPTIMIZING FRACTIONAL RESOURCE ALLOCATION

(75) Inventors: Balaji Venkata Atyam, Austin, TX (US); Franck Barillaud, Austin, TX (US); Matthew F. Cali, Wake Forest, NC (US); Anita Govindjee, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 1914 days.

(21) Appl. No.: 11/260,625

(22) Filed: Oct. 27, 2005

(65) Prior Publication Data
US 2007/0101334 A1    May 3, 2007

(51) Int. Cl.
G06F 9/46     (2006.01)
G06F 9/455    (2006.01)
(52) U.S. Cl. ............................. 718/104; 718/1; 718/100
(58) Field of Classification Search .............. 718/1, 104, 718/105, 102, 100, 101; 709/224, 226
See application file for complete search history.

(56) References Cited

U.S. PATENT DOCUMENTS

| | | | |
|---|---|---|---|
| 5,471,677 A | 11/1995 | Imanaka | |
| 6,658,391 B1 | 12/2003 | Williams et al. | |
| 6,807,542 B2 | 10/2004 | Bantz et al. | |
| 7,281,045 B2* | 10/2007 | Aggarwal et al. | 709/226 |
| 2002/0165750 A1 | 11/2002 | Fouquet | |
| 2004/0003063 A1 | 1/2004 | Ashok et al. | |
| 2004/0015976 A1* | 1/2004 | Lam | 718/104 |
| 2004/0030777 A1* | 2/2004 | Reedy et al. | 709/224 |
| 2004/0122725 A1 | 6/2004 | Womack et al. | |
| 2004/0138944 A1 | 7/2004 | Whitacre et al. | |
| 2004/0143664 A1* | 7/2004 | Usa et al. | 709/226 |
| 2004/0215915 A1 | 10/2004 | Block et al. | |
| 2005/0021541 A1 | 1/2005 | Rangadass et al. | |
| 2005/0027980 A1 | 2/2005 | Peled et al. | |

* cited by examiner

*Primary Examiner* — Emerson Puente
*Assistant Examiner* — Willy W Huaracha
(74) *Attorney, Agent, or Firm* — Yee & Associates PC

(57) ABSTRACT

A computer-implemented method, apparatus, and computer program product are disclosed for optimizing the fractional allocation of a computing resource among multiple partitions in a data processing system. Multiple processing attributes are defined. A policy is generated for a first partition. The policy includes the definition of the processing attributes. Current values are determined for the first partition for the processing attributes. The policy and the current values are then used to determine a fractional portion of the resource to be allocated to the first partition.

15 Claims, 6 Drawing Sheets

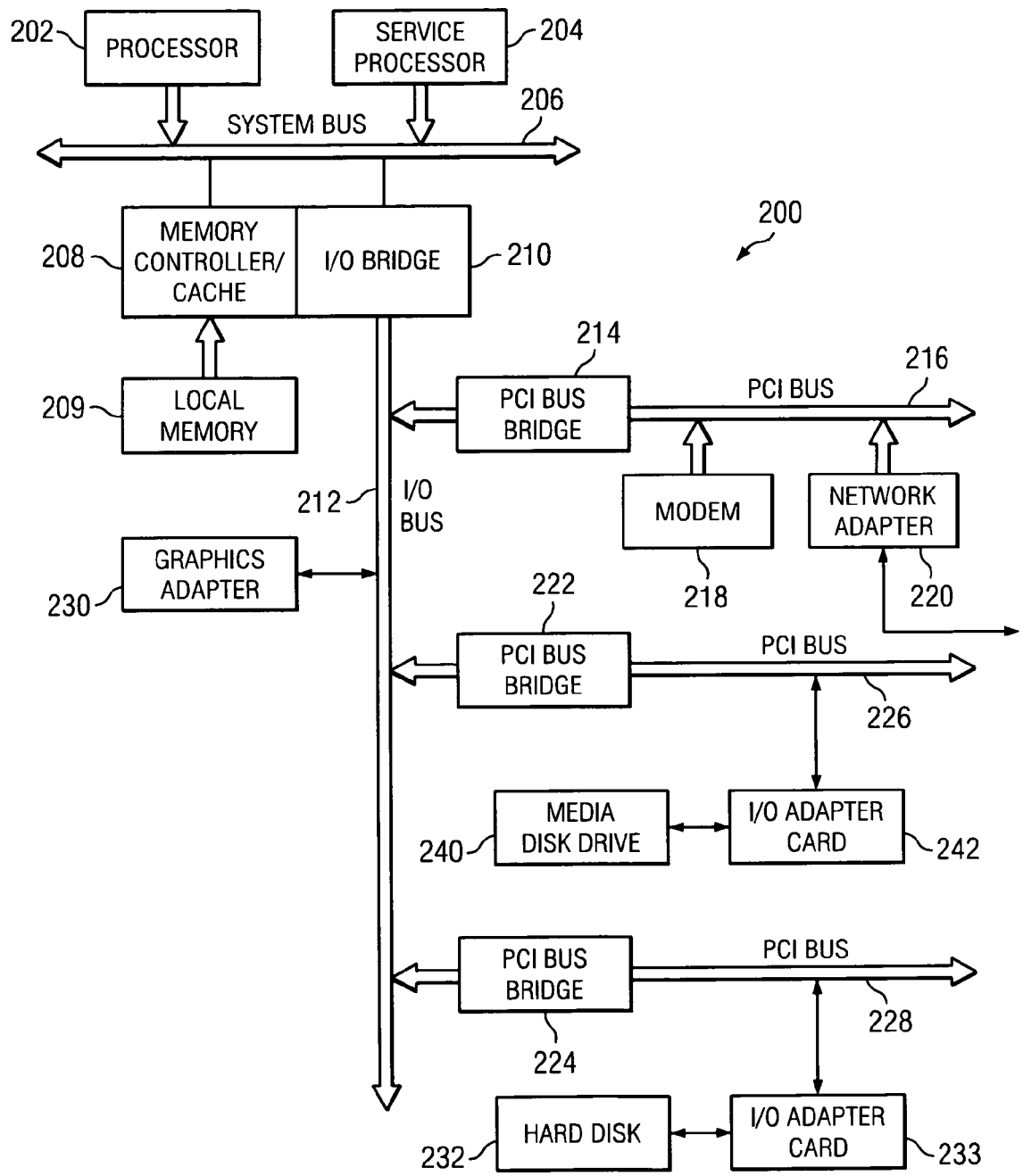

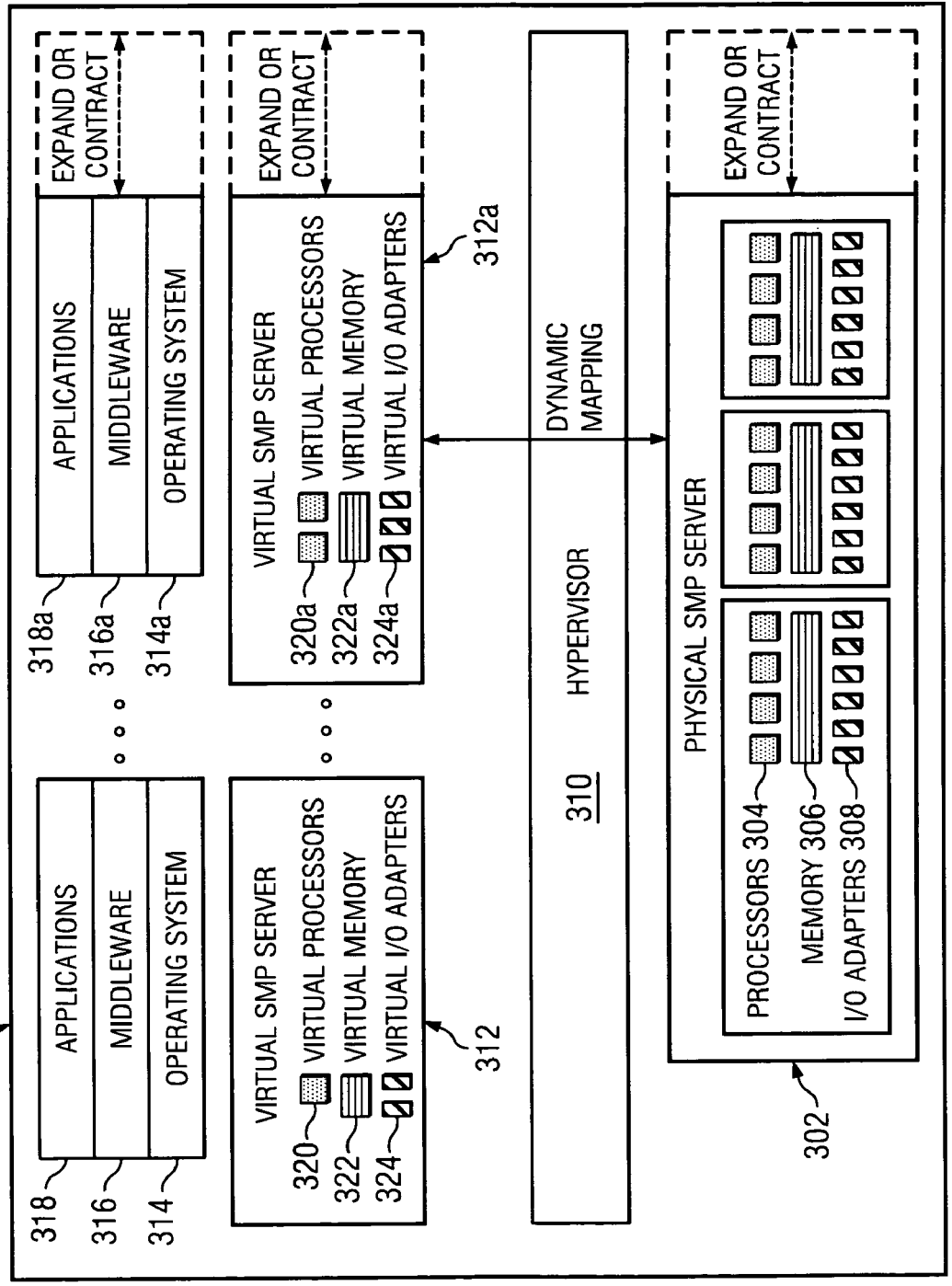

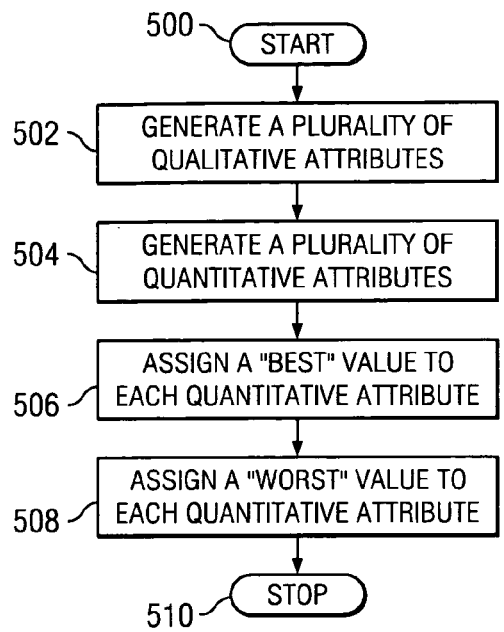
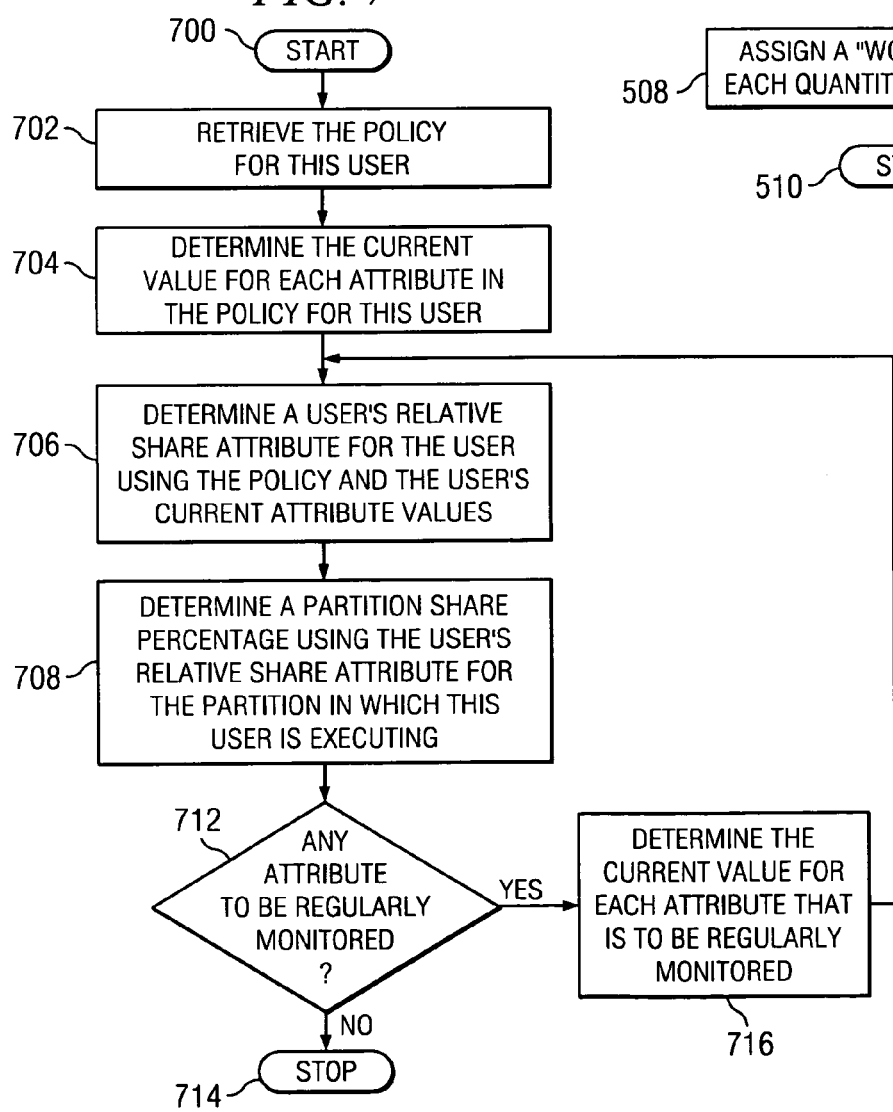

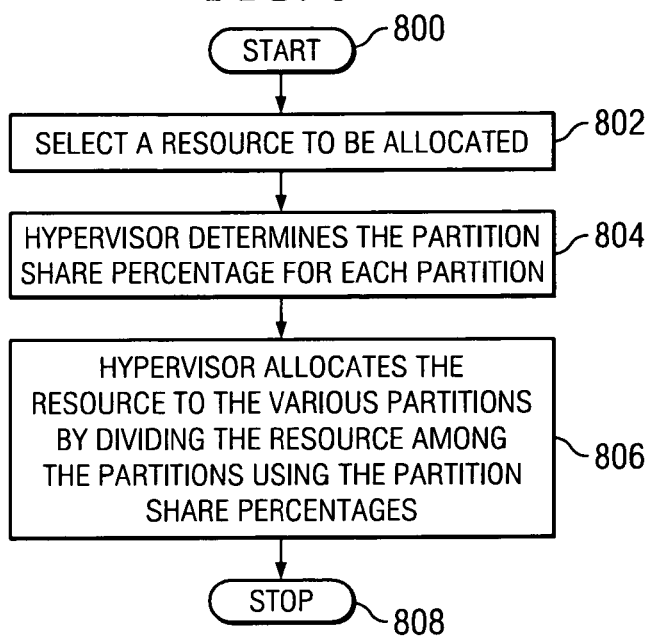
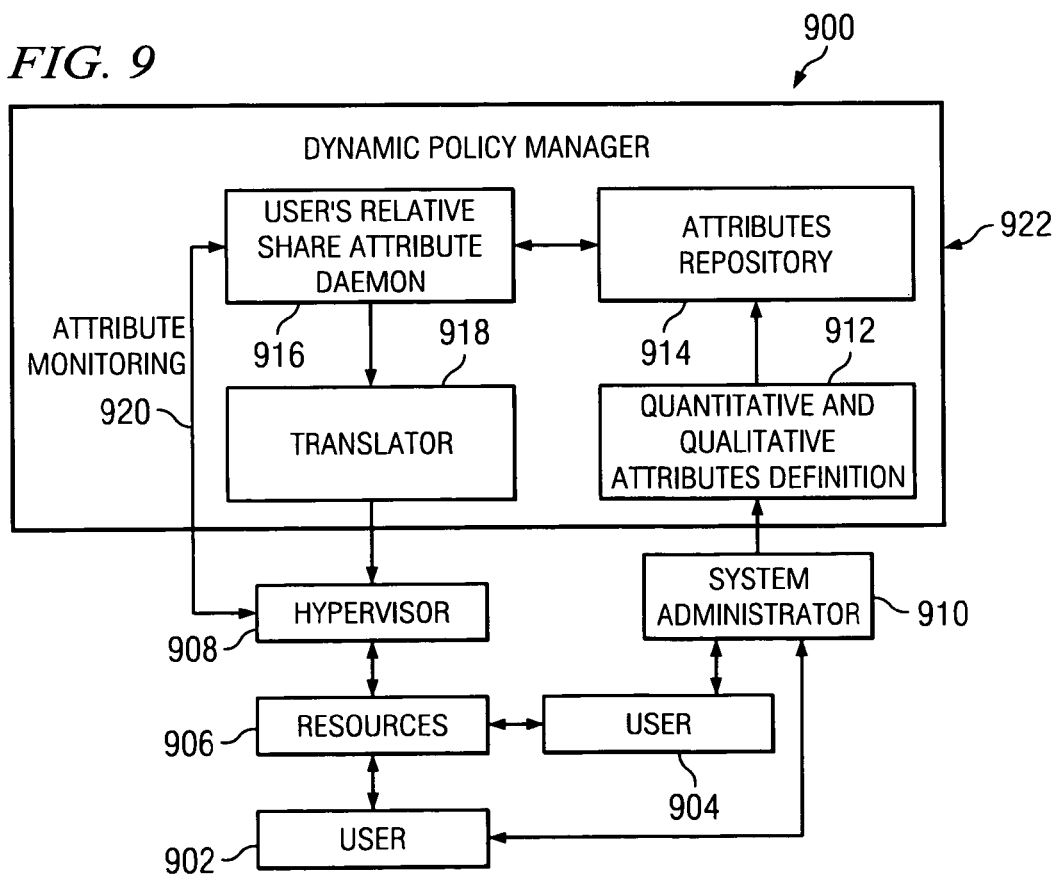

DYNAMIC POLICY MANAGER METHOD, SYSTEM, AND COMPUTER PROGRAM PRODUCT FOR OPTIMIZING FRACTIONAL RESOURCE ALLOCATION

BACKGROUND OF THE INVENTION

1. Field of the Invention

The preferred embodiment relates generally to data processing systems and, more specifically, to a dynamic policy manager method, system, and computer program product for optimizing fractional resource allocation of a single resource among multiple partitions.

2. Description of the Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in an LPAR system, these resources are disjointly shared among various partitions, themselves disjoint, each one seeming to be a stand-alone computer. These resources may include, for example, input/output (I/O) adapters, memory DIMMs, non-volatile random access memory (NVRAM), and hard disk drives. Each partition within the LPAR system may be booted and shutdown over and over without having to power-cycle the whole system.

In these prior art systems, these resources were allocated in their entirety to logical partitions. Thus, the entire resource was allocated as a single unit to a particular partition. With the virtualization of resources, however, fractions of a resource now may be allocated to partitions. Thus, one physical resource may be divided and allocated to more than one partition at a time. In these systems, a first fraction of a single resource may be allocated to a first partition at the same time that a second fraction is allocated to a second partition and a third fraction is allocated to a third partition.

In known systems, when a resource becomes available fractions of that resource are allocated evenly to the partitions that have requested the resource. The resource is divided up evenly regardless of any policy the system administrator wants to enforce and regardless of whether or not the partitions are actually using the resource. The resource is divided evenly among the requesting users. Typically, a user is a logical partition.

For example, if three users were to be allocated this resource, the resource would be divided into thirds, and each third would be granted to one of the users. At a later time if another user were to request a resource and this resource was chosen to be allocated to the new user, the resource would be divided up evenly among all of the four current users. The resource would be reallocated so that each user would now receive one-fourth of the resource instead of one-third of the resource.

In some known systems, resources are allocated by a reservation method. In these systems, the resources are allocated on a first come, first served basis. In these systems, a user must wait for a resource to become available before a resource will be allocated to that user.

In other systems, sometimes referred to as "on-demand" systems, resources are allocated when a resource is requested. Thus, when a user requests a resource, the system will allocate a resource to the user by reallocating resources, if necessary, that are already allocated to other users.

Therefore, a need exists for a method, apparatus, and computer program product for dynamically allocating fractions of a resource in a data processing system based on a policy and particular customer usage of the data processing system.

SUMMARY OF THE INVENTION

A computer-implemented method, apparatus, and computer program product are disclosed for optimizing the fractional allocation of a computing resource among multiple users in a data processing system. Multiple processing attributes are defined. A policy is generated for a first user. The policy includes the definition of the processing attributes. Current values are determined for the first user for the processing attributes. The policy and the current values are then used to determine a fractional portion of the resource to be allocated to the first user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of a computer system that includes the preferred embodiment;

FIG. 3 is a block diagram of a data processing system, including a hypervisor, in which the preferred embodiment may be implemented;

FIG. 5 illustrates a high level flow chart that depicts generating a plurality of attributes in accordance with the preferred embodiment;

FIG. 7 illustrates a high level flow chart that depicts determining a share for each partition for a particular policy for a particular user in accordance with the preferred embodiment;

FIG. 8 depicts a high level flow chart that illustrates allocating a resource in accordance with the preferred embodiment; and FIG. 9 illustrates a block diagram of a data processing system in which resources are allocated according to user policies in accordance with the preferred embodiment.

DETAILED DESCRIPTION OF THE PREFERRED EMBODIMENT

Figure 1:
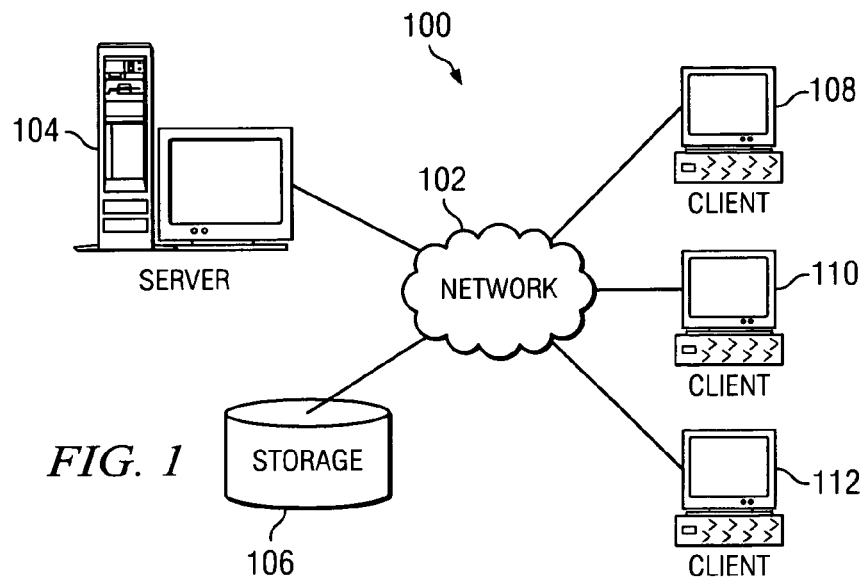
FIG. 1 is a pictorial representation of a network of computer systems that includes the preferred embodiment.

The preferred embodiment is a dynamic policy manager that dynamically and automatically allocates fractions of a resource within a data processing system to users based on one or more policies and the current utilization of resources by these users. A policy is generated for one or more users. For example, a particular project may be a high priority. In this case, the system administration might generate a particular policy in order to grant a greater percentage of a resource to users who are working on that project.

The policy is generated by selecting and ranking particular attributes. The policy can be dynamically and automatically modified during processing of the data processing system by selecting different attributes and/or by modifying the attributes' parameters, such as the ranking.

The dynamic policy manager determines a user's relative share attribute for each user. The user's relative share attribute is determined by analyzing the current value of each selected attribute for each user. In addition, each user's relative utilization of resources is taken into account when determining the user's relative share attribute for each user.

The dynamic policy manager then translates the user's relative share attribute into a partition share percentage for each user. Fractions of a resource are then allocated, by a hypervisor, to the partition in which each user is executing according to the user's partition share percentage.

In this manner, a resource is allocated to multiple different partitions by dividing the resource among the partitions according to each partition's partition share percentage.

Alternatively, instead of dividing a single resource according to the partition share percentage, the preferred embodiment may be used when deciding to which partition to allocate an entire resource. High priority resources may be allocated to users that have a greater user's relative share attribute. A high priority resource could be a resource that is frequently in demand, a more powerful version of a resource, or any other resource that the system administrator wants to control.

The user's relative share attribute can be automatically and dynamically updated by the dynamic policy manager during processing. The current values for particular attributes are monitored and updated during processing. The user's relative share attribute is then continuously updated during processing, and thus, the partition share percentage is also continuously updated. The hypervisor then uses this continuously updated partition share percentage when allocating resources. In this manner, the percentage of the resources allocated to each partition may be dynamically altered.

A policy is generated by selecting a set of qualitative and/or quantitative attributes. For every user the administrator defines a set of qualitative and/or quantitative attributes that represent the way the administrator wants to prioritize the users.

A qualitative attribute is an attribute that is assigned non-numeric values. The format of a qualitative attribute is:
  Private String[ ] names;
  Private int[ ] ranks;

All qualitative attribute names are kept in a string array that describes the data within the attribute. Corresponding to the string name array is a "ranks" array that describes the rank for each named attribute. The index of a name and its rank are the same in both arrays. Thus, for example, the second listed name in the name array corresponds to the second listed rank in the rank array.

An example of a qualitative attribute is "Development Platforms". Example values for the "Development Platforms" attribute may be "POWER5", "POWER4", and "other". Thus, a user might be using a platform that is based on the POWER5 set of processors, the POWER4 set of processors, or a different set of processors which would be classified as "other".

These different possible platforms are then ranked by the system administrator according to which platform the system administrator wants to give preference to. For example, the system administrator might rank the POWER5 platform as higher than the POWER4 platform, and the POWER4 platform as higher than all other platforms.

In this case, the commands would be:
  Names={POWER5, POWER4, other}
  Ranks={1, 2, 3}
which would indicate that "POWER5" has a rank of "1", "POWER4" has a rank of "2", and "other" has a rank of "3".

A quantitative attribute is an attribute that has a numeric value. A "best" possible value and a "worst" possible value are defined for each quantitative attribute. The highest possible numeric value may not necessarily be the "best" possible value, and the lowest possible value may not necessarily be the "worst" possible value.

An example of a quantitative attribute is a "percentage of utilization of the resource" attribute. The best value in this case is 100 which means that the user accessed the resource during the entire time the resource was made available to the user. The worst value in this case is 0 which means that the user did not access the resource at all during the time the resource was made available to the user.

A user's relative share attribute daemon is provided by the preferred embodiment which determines a user's relative share attribute. The user's relative share attribute is then used to determine a partition share percentage. The partition share percentage is the percentage of a resource that will be allocated to a partition in which the user is executing. The user's relative share attribute daemon determines the user's relative share attribute by evaluating the current values for a user of the attributes that are included within the policy that is being implemented.

The user's relative share attribute daemon determines the current value, for the user, for the attributes specified by the policy. Some attributes are regularly monitored by the daemon and the current values for the users regularly updated by the daemon.

The "percentage of utilization of the resource" attribute is an example of a "monitored" attribute. The current value of the user's percentage utilization of the resource is regularly measured. The user's relative share attribute daemon then regularly updates the user's relative share attribute for this user using the updated current value for each monitored attribute. Thus, the daemon regularly monitors the processing activity to determine whether the user is currently accessing a particular resource and the amount of time the user is actually using the resource.

The process described above is performed for each user in the data processing system for which the policy is defined. Several policies may be enforced concurrently. In addition, there may be several users that are concurrently monitored for which one or more policies are enforced. There may be several users that are included within the same one or more policies.

The following is an example of the preferred embodiment:

Two users, XX and YY, exist for which a particular policy will be enforced. Two attributes, a development platform attribute referred to below as "DevPlat" and a percentage of utilization of the resource attribute referred to below as "PercUtilRes", have been selected to be included in the policy to be enforced for users XX and YY. The PercUtilRes attribute has been assigned a "best" value of "100" and a "worst" value of "0".

The possible non-numeric values for the DevPlat attribute are "POWER5", "POWER4", and "other". The system administrator then ranked the values for the DevPlat attribute by assigning the following rankings: POWER5=1, POWER4=2, and other=3.

The system administrator then ranked all attributes together by assigning the following rankings: PercUtilRes=1, and DevPlat=2. Using these overall rankings, the following percentage of the total were assigned: DevPlat=⅔, and PercUtilRes=⅓.

This policy is then saved for users XX and YY.

The current values of each attribute for each user are then obtained. The following are example values for users XX and YY: User XX is using POWER4 and currently is utilizing 75% of the resource. User YY is using POWER5 and currently is utilizing 20% of the resource.

The user's relative share attribute can then be determined as follows for each user:

For user XX, the PercUtilRes weight is (75)(1/100)=0.75. The DevPlat weight is rank 2 out of 3 because user XX is using POWER4 which is rank 2. Rank 1 has a value of 1. Rank 2 has a value of 0.67. Rank 3 has a value of 0.33. Therefore, the DevPlat weight for this user is 0.67 since user XX is using POWER4 which is rank 2. The user's relative share attribute for user XX is equal to (percentage of total for DevPlat)(this user's DevPlat weight)+(percentage of total for PercUtilRes)(this user's PercUtilRes weight) which is equal to: (⅔)(0.67)+(⅓)(0.75) which is 0.696.

For user YY, the PercUtilRes weight is (20)(1/100)=0.20. The DevPlat weight is rank 1 out of 3 because user YY is using POWER5 which is rank 1. Therefore, the DevPlat weight is 1 since user YY is using POWER5. The user's relative share attribute for user YY is (⅔)(1)+(⅓)(0.20) which is 0.733.

The larger user's relative share attribute is allocated a larger percentage of a resource. Therefore, the partition in which user YY is executing will be granted a larger percentage of each resource when a resource is to be allocated.

FIG. 1 is a pictorial representation of a network of computer systems that includes the preferred embodiment. Network data processing system 100 is a network of computers in which the preferred embodiment may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications, to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the preferred embodiment.

FIG. 2 is a block diagram of a computer system that includes the preferred embodiment. Computer system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to other computers may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 may also be connected to I/O bus 212 as depicted, either directly or indirectly.

A storage device, such as hard drive 232 is coupled to a PCI bus, such as bus 228, via an I/O adapter card 233. Hard drive 232 may be implemented using any type of technology. For example, hard drive 232 may be a SAS drive or may be a SCSI drive. Adapter card 233 then maps PCI bus as either a SCSI bus or SAS bus depending on the type of interface technology supported by the hard drive 232.

Another storage device, such as a digital media drive 240, is included in system 200. Digital media drive 240 is coupled to PCI bus 226 via an I/O adapter card 242. Digital media drive 240 may be utilized to read, i.e. play, data that is stored on digital storage media, such as a CD-ROM or a DVD-ROM, when that digital storage media is inserted into digital media drive 240. Other types of digital storage media may be utilized in digital media drive 240 to play the data that is stored in the digital storage media.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the preferred embodiment.

FIG. 3 is a block diagram of a data processing system 300, including a hypervisor, in which the preferred embodiment may be implemented. System 300 is preferably a symmetric multiprocessing (SMP) server computer system. SMP server computer system 300 includes physical hardware devices that can be mapped to, i.e. temporarily owned by, a user application to execute that application.

SMP server computer system 300 includes a physical SMP server 302. Physical SMP server 302 includes physical hardware devices such as processors 304, memory 306, and I/O adapters 308. These physical devices are managed by hypervisor 310. Each one of the processors 304 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 300. A virtual server appears to be a physical SMP server to its user: the operating system, middleware, and application software that run upon it. SMP server computer system 300 includes one or more virtual servers such as virtual server 312 and virtual server 312*a*.

Each virtual server appears to its software to include its own virtual processor(s), memory, and I/O adapter(s) that are available for the exclusive use of that virtual server. For example, virtual server 312 includes a virtual processor 320, virtual memory 322, and virtual I/O adapters 324. Virtual server 312*a* includes virtual processors 320*a*, virtual memory 322*a*, and virtual I/O adapters 324*a*.

Each virtual server supports its own software environment, including an operating system, middleware, and applications. The software environment of each virtual server can be different from the software environment of other virtual servers. For example, the operating systems executed by each virtual server may differ from one another.

For example, virtual server 312 supports operating system 314, middleware 316, and applications 318. Virtual server 312*a* supports operating system 314*a*, middleware 316*a*, and applications 318*a*. Operating systems 314 and 314*a* may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 310 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 304, is selected by hypervisor 310 to be used to execute and implement that virtual processor. Hypervisor 310 manages the selections of physical devices and their temporary assignment to virtual devices.

Hypervisor 310 is responsible for dynamically creating, managing, and destroying virtual SMP servers. Whole virtual processors, virtual I/O adapters, and virtual memory blocks can be removed or added by hypervisor 310. Hypervisor 310 is also responsible for dynamic resource allocation, managing time-sharing of physical resources, and altering the physical resource mapped to a processor without involving the operating system. Hypervisor 310 is also able to dedicate physical resources to virtual resources for situations where sharing is not desired. Hypervisor 310 is responsible for managing the addition or removal of physical resources. Hypervisor 310 makes these additions and deletions transparent to the upper level applications.

Figure 4:
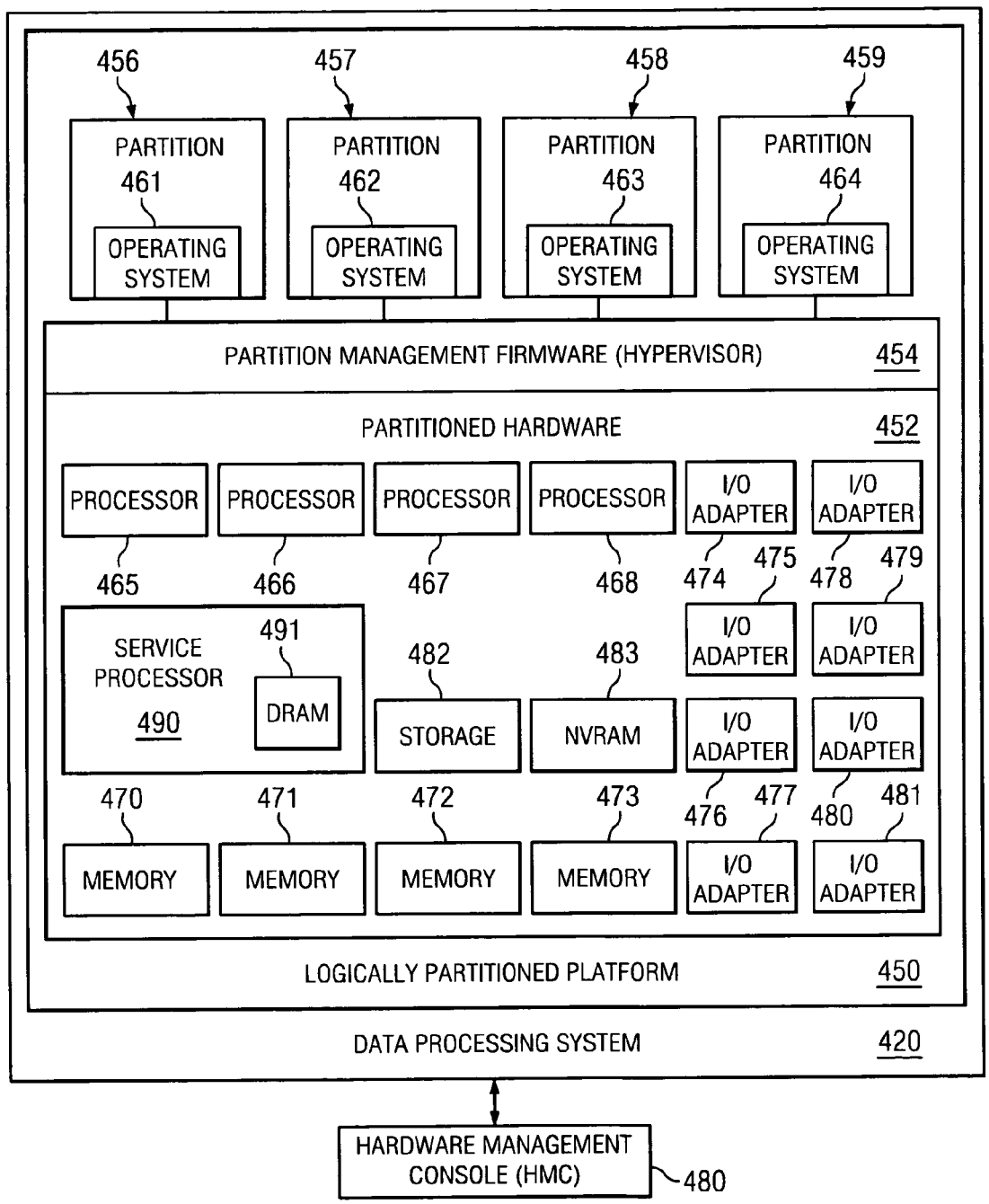
FIG. 4 is a block diagram of a logically partitioned platform that includes the preferred embodiment.

FIG. 4 is a block diagram of a logically partitioned platform that includes the preferred embodiment. Data processing system 420 includes logically partitioned platform 450. Platform 450 includes partitioned hardware 452, partition management firmware, also called a hypervisor 454, and partitions 456-459. Operating systems 461-464 exist within partitions 456-459. Operating systems 461-464 may be multiple copies of a single operating system or multiple heterogeneous operating systems simultaneously run on platform 450.

Partitioned hardware 452 includes a plurality of SMT-capable processors 465-468, a plurality of system memory units 470-473, a plurality of input/output (I/O) adapters 474-481, and a storage unit 482. Each of the processors 465-468, memory units 470-473, NVRAM storage 483, and I/O adapters 474-481 may be assigned to one of multiple partitions 456-459. Partitioned hardware 452 also includes service processor 490. A non-volatile memory device 491, such as an NVRAM device, is included within service processor 490.

Partition management firmware (hypervisor) 454 performs a number of functions and services for partitions 456-459 to create and enforce the partitioning of logically partitioned platform 450. Hypervisor 454 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 454 allows the simultaneous execution of independent OS images 461-464 by virtualizing all the hardware resources of logically partitioned platform 450. Hypervisor 454 may attach I/O devices through I/O adapters 474-481 to single virtual machines in an exclusive mode for use by one of OS images 461-464.

A hardware management console (HMC) 480 may be coupled to service processor 490 in data processing system 420. HMC 480 is a separate computer system that is coupled to service processor 490 and may be used by a user to control various functions of system 420 through service processor 490.

FIG. 5 illustrates a high level flow chart that depicts generating a plurality of attributes in accordance with the preferred embodiment. The process starts as depicted by block 500 and thereafter passes to block 502 which illustrates generating a plurality of qualitative attributes. Next, block 504 depicts generating a plurality of quantitative attributes.

The process then passes to block 506 which illustrates assigning a "best" value to each quantitative attribute. Next, block 508 depicts assigning a "worst" value to each quantitative attribute. The quantitative attributes are then ranked between the best and worst values. The process then terminates as illustrated by block 510.

Figure 6:
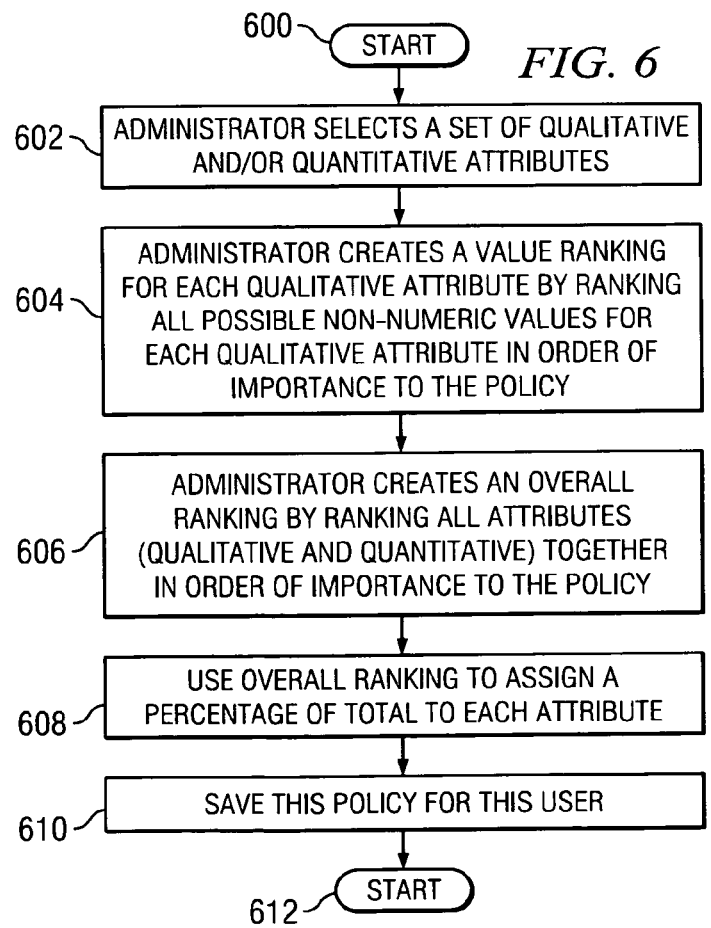
FIG. 6 depicts creating a policy for a user for managing the allocation of resources in accordance with the preferred embodiment.

FIG. 6 depicts creating a policy for a user for managing the allocation of resources in accordance with the preferred embodiment. The process starts as depicted by block 600 and thereafter passes to block 602 which illustrates an administrator selecting a set of qualitative and/or quantitative attributes to use in a particular policy for a particular user. Next, block 604 depicts the administrator creating a value ranking for each qualitative attribute by ranking all possible non-numeric values for each qualitative attribute in order of importance to the particular policy.

Block 606, then, illustrates the administrator creating an overall ranking by ranking all attributes together, both qualitative and quantitative, in order of importance to the particular policy. The process then passes to block 608 which depicts using the overall ranking to assign a percentage of the total to each attribute. Thereafter, block 610 illustrates saving this policy for this user. The process then terminates as depicted by block 612.

FIG. 7 illustrates a high level flow chart that depicts determining a percentage share for each partition for a particular policy for a particular user in accordance with the preferred embodiment. The process starts as depicted by block 700 and thereafter passes to block 702 which illustrates retrieving the policy for this user. Next, block 704 depicts determining the current value for each attribute that is included in this user's policy. Block 706, then, illustrates determining a user's relative share attribute for this user using the policy and the user's current attribute values.

The process then passes to block 708 which depicts determining a partition share percentage using the user's relative share attribute for the partition in which this user is executing. Block 712, then, depicts a determination of whether or not the policy includes any attribute that is to be regularly monitored. If a determination is made that there is at least one attribute that is to be regularly monitored, the process passes to block 716 which illustrates determining the current value for each attribute that is to be regularly monitored. The process then passes back to block 706.

Referring again to block 712, if a determination is made that there is no attribute to be regularly monitored in the policy, the process terminates as illustrated by block 714.

FIG. 8 depicts a high level flow chart that illustrates allocating a resource in accordance with the preferred embodiment. The process starts as depicted by block 800 and thereafter passes to block 802 which illustrates selecting a resource to be allocated among the partitions according to the policy that is currently being used. Next, block 804 depicts the hypervisor determining the partition share percentage for each partition.

Block 806, then, illustrates the hypervisor allocating the resource to the various partitions by dividing the resource among the partitions using the partition share percentages. The process then terminates as depicted by block 808.

FIG. 9 illustrates a block diagram of a data processing system in which a portion of a resource is allocated according to user policies in accordance with the preferred embodiment. Data processing system 900 includes one or more users, such as user 902 and user 904.

A user may be any process, service, application, program, or routine that is executing or a person, company, or entity that is causing a process, service, application, program, or routine to execute within data processing system 900. Users may be located in geographically similar or diverse locations. Users may be executing within the same computer system or may be executing within entirely separate, different computer systems. Each user may be executing within its own logical partition within a single data processing system.

Some or all of resources 906 may be shared by the various users, including user 902 and user 904. According to the preferred embodiment, a fraction of one of the resources 906 is allocated to users 904, 904 automatically and dynamically according to a system administrator's policy and based on each user's actual usage of one or more of the resources 906.

System administrator 910 can create a policy for allocating a portion of one of the resources 906. System administrator 910 then defines qualitative and/or quantitative attributes that are used to implement the policy. The quantitative and qualitative attributes definition 912 is generated by system administrator 910 and then stored in attributes repository 914.

A user's relative share daemon 916 continually executes to calculate the relative share of a resource that can be allocated to each user. The user's relative share daemon 916 accesses attributes repository 914 to retrieve the attributes and information about the attributes that are specified by a particular policy. User's relative share daemon 916 first determines for the user the current value for each attribute that can be monitored. User's relative share daemon 916 then determines the user's relative share attribute for each user using the policy and the user's current attribute values.

Daemon 916 sends the user's relative share attribute to translator 918 which then uses the user's relative share attribute to determine a partition share percentage for the partition in which this user is executing. Translator 918 provides the partition share percentage to hypervisor 908. Hypervisor 908 then allocates a resource within resources 906 by dividing the resource between users 902 and 904 according to the partition share percentages for each user 902 and 904.

Daemon 916 continuously monitors the current value for some users for particular attributes, as depicted by attributes monitoring 920. Daemon 916 then updates its user's relative share percentage attributes for those users. Daemon 916 sends the updated user's relative share percentage to the translator 918 which once again determines a partition share percentage for the partition in which each one of the users is executing. Translator 918 then sends the updated partition share percentage to hypervisor 908 which will reallocate the resource, if necessary, according to the updated partition share percentage.

The preferred embodiment is a dynamic policy manager, depicted by block 922, which is capable of dynamically allocating fractions of a resource according to a user's current utilization of resources and according to one or more policies defined by a system administrator.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the preferred embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for optimizing the fractional allocation of a first resource among a plurality of partitions in a data processing system, said method comprising:
   defining a plurality of processing attributes, said processing attributes including qualitative attributes and quantitative attributes, wherein each one of said qualitative attributes includes a plurality of possible qualitative attribute names;
   for a particular one of said qualitative attributes: receiving a particular ranking for the plurality of possible qualitative attribute names for the particular one of said qualitative attributes, wherein a rank for a second particular one of the plurality of possible qualitative attribute names is received, wherein each one of the plurality of possible qualitative attribute names for the particular one of said qualitative attributes is ranked with respect to all other ones of the plurality of possible qualitative attribute names for the particular one of said qualitative attributes;
   receiving an overall ranking of said qualitative attributes and said quantitative attributes, wherein each one of said quantitative attributes and each one of said qualitative attributes receives a different rank within the overall ranking;
   generating a policy for at least one of said plurality of partitions, said policy including said definition of said plurality of processing attributes;
   for at least one of said plurality of partitions, determining first values for each one of said qualitative attributes using said particular ranking;
   for at least one of said plurality of partitions, measuring second values for each one of said quantitative attributes;
   assigning a percentage to each one of said qualitative attributes and to each one of said quantitative attributes using said overall ranking; and
   determining a fractional portion of said first resource to be allocated to said at least one of said plurality of partitions utilizing said policy, said first values, said second values, and said percentage.

2. The computer-implemented method according to claim 1, further comprising: continually measuring said second values during processing; and in response to determining that said second values for said at least one of said plurality of partitions have changed, modifying said fractional portion during processing.

3. The computer-implemented method according to claim 1, further comprising:
   generating a second policy for a first plurality of said plurality of partitions;
   for each one of said first plurality of said plurality of partitions, determining third values for each one of said qualitative attributes using said particular ranking;
   for each one of said first plurality of said plurality of partitions, measuring fourth values for each one of said quantitative attributes;
   determining a fractional portion of said first resource to be allocated to each one of said first plurality of said plurality of partitions utilizing said second policy, said third values, said fourth values, and said percentage; and
   for each one of said first plurality of said plurality of partitions, allocating a fractional portion of said first resource to one of said first plurality of said plurality of partitions in which said one of said first plurality of said plurality of partitions is executing.

4. The computer-implemented method according to claim 1, wherein each one of said quantitative attributes and each one of said qualitative attributes is ranked with respect to all other ones of said quantitative attributes and said qualitative attributes in order of importance to said policy.

5. The computer-implemented method according to claim 1, further comprising: storing the plurality of possible qualitative attribute names in a first array; storing the rank for each one of the plurality of possible qualitative attribute names in a second array; wherein a first particular location in the first array corresponds to a second particular location in the second array, and wherein a first one of the plurality of possible qualitative attribute names that is stored in the first particular location has a first rank, and wherein the first rank is stored in the second particular location.

6. A computer program product comprising:
   a non-transitory computer storage medium having computer usable program code for optimizing the fractional allocation of a first resource among a plurality of partitions in a data processing system, said computer program product including:
   computer usable program code for defining a plurality of processing attributes, said processing attributes including qualitative attributes and quantitative attributes, wherein each one of said qualitative attributes includes a plurality of possible qualitative attribute names;
   computer usable program code for defining a plurality of processing attributes, said processing attributes including qualitative attributes and quantitative attributes, wherein each one of said qualitative attributes includes a plurality of possible qualitative attribute names for a particular one of said qualitative attributes: computer usable program code for receiving a particular ranking for the plurality of possible qualitative attribute names for the particular one of said qualitative attributes, and wherein a rank for a second particular one of the plurality of possible qualitative attribute names is received, wherein each one of the plurality of possible qualitative attribute names for the particular one of said qualitative attributes is ranked with respect to all other ones of the plurality of possible qualitative attribute names for the particular one of said qualitative attributes;
   computer usable program code for receiving an overall ranking of said qualitative attributes and said quantitative attributes, wherein each one of said quantitative attributes and each one of said qualitative attributes receives a different rank within the overall ranking;

computer usable program code for generating a policy for at least one of said plurality of partitions, said policy including said definition of said plurality of processing attributes;

for at least one of said plurality of partitions, computer usable program code for determining first values for each one of said qualitative attributes using said particular ranking for at least one of said plurality of partitions, computer usable program code for measuring second values for each one of said quantitative attributes;

computer usable program code for assigning a percentage to each one of said qualitative attributes and to each one of said quantitative attributes using said overall ranking; and computer usable program code for determining a fractional portion of said first resource to be allocated to said at least one of said plurality of partitions utilizing said policy, said first values, said second values, and said percentage.

7. The computer program product according to claim 6, further comprising: computer usable program code for continually measuring said second values during processing; and in response to determining that said second values for said at least one of said plurality of partitions have changed, computer usable program code for modifying said fractional portion during processing.

8. The computer program product according to claim 6, further comprising:

computer usable program code for generating a second policy for a first plurality of said plurality of partitions;

for each one of said first plurality of said plurality of partitions, computer usable program code for determining third values for each one of said qualitative attributes using said particular ranking;

for each one of said first plurality of said plurality of partitions, computer usable program code for measuring fourth values for each one of said quantitative attributes;

computer usable program code for determining a fractional portion of said first resource to be allocated to each one of said first plurality of said plurality of partitions utilizing said second policy, said third values, said fourth values, and said percentage; and for each one of said first plurality of said plurality of partitions, computer usable program code for allocating a fractional portion of said first resource to one of said first plurality of said plurality of partitions in which said one of said first plurality of said plurality of partitions is executing.

9. The computer program product according to claim 6, wherein each one of said quantitative attributes and each one of said qualitative attributes is ranked with respect to all other ones of said quantitative attributes and said qualitative attributes in order of importance to said policy.

10. The computer program product according to claim 6, further comprising: computer usable program code for storing the plurality of possible qualitative attribute names in a first array; computer usable program code for storing the rank for each one of the plurality of possible qualitative attribute names in a second array; wherein a first particular location in the first array corresponds to a second particular location in the second array, and wherein a first one of the plurality of possible qualitative attribute names that is stored in the first particular location has a first rank, and wherein the first rank is stored in the second particular location.

11. An apparatus in a data processing system for optimizing the fractional allocation of a first resource among a plurality of partitions including within said data processing system, said apparatus comprising:

a hardware platform that includes a plurality of hardware devices, wherein at least a portion of at least one of the plurality of hardware devices has been assigned to one of the plurality of partitions;

a plurality of processing attributes, wherein said processing attributes includes qualitative attributes and quantitative attributes, wherein each one of said qualitative attributes includes a plurality of possible qualitative attribute names;

wherein, for a particular one of said qualitative attributes: a particular ranking is received for the plurality of possible qualitative attribute names for the particular one of said qualitative attributes, wherein a rank for a second particular one of the plurality of possible qualitative attribute names is received, wherein each one of the plurality of possible qualitative attribute names for the particular one of said qualitative attributes is ranked with respect to all other ones of the plurality of possible qualitative attribute names for the particular one of said qualitative attributes;

an overall ranking, wherein each one of said quantitative attributes and each one of said qualitative attributes receives a different rank within the overall ranking;

a policy generated for at least one of said plurality of partitions, said policy including said definition of said plurality of processing attributes;

for at least one of said plurality of partitions, a policy manager for determining first values for each one of said qualitative attributes using said particular ranking;

for at least one of said plurality of partitions, a policy manager for measuring second values for each one of said quantitative attributes;

a percentage assigned to each one of said qualitative attributes and to each one of said quantitative attributes using said overall ranking; and said policy manager for determining a fractional portion of said first resource to be allocated to said at least one of said plurality of partitions utilizing said policy, said first values, said second values, and said percentage.

12. The apparatus according to claim 11, further comprising: said policy manager for continually measuring said second values during processing; and in response to determining that said second values for said at least one of said plurality of partitions have changed, said policy manager for modifying said fractional portion during processing.

13. The apparatus according to claim 11, further comprising:

a second policy defined for a first plurality of said plurality of partitions;

for each one of said first plurality of said plurality of partitions, said policy manager determining third values for each one of said qualitative attributes using said particular ranking;

for each one of said first plurality of said plurality of partitions, said policy manager measuring fourth values for each one of said quantitative attributes;

said policy manager determining a fractional portion of said first resource to be allocated to each one of said first plurality of said plurality of partitions utilizing said second policy, said third values, said fourth values, and said percentage; and said data processing system including a CPU executing code for allocating, for each one of said first plurality of said plurality of partitions, a fractional portion of said first resource to one of said first plurality of said plurality of partitions in which said one of said first plurality of said plurality of partitions is executing.

14. The apparatus according to claim 11, wherein each one of said quantitative attributes and each one of said qualitative attributes is ranked with respect to all other ones of said quantitative attributes and said qualitative attributes in order of importance to said policy.

15. The apparatus according to claim 11, further comprising: wherein the plurality of possible qualitative attribute names are stored in a first array; wherein the rank for each one of the plurality of possible qualitative attribute names are stored in a second array; wherein a first particular location in the first array corresponds to a second particular location in the second array, and wherein a first one of the plurality of possible qualitative attribute names that is stored in the first particular location has a first rank, and wherein the first rank is stored in the second particular location.

* * * * *